United States Patent
Saruwatari et al.

(10) Patent No.: US 10,981,254 B2
(45) Date of Patent: Apr. 20, 2021

(54) NI-BASED ALLOY CORE WIRE FOR COVERED ELECTRODE, COVERED ELECTRODE, AND METHOD OF MANUFACTURING COVERED ELECTRODE

(71) Applicant: NIPPON STEEL CORPORATION, Tokyo (JP)

(72) Inventors: Suo Saruwatari, Tokyo (JP); Kazuhiro Kojima, Tokyo (JP); Takashi Namekata, Futtsu (JP)

(73) Assignee: NIPPON STEEL CORPORATION, Tokyo (JP)

( * ) Notice: Subject to any disclaimer, the term of this patent is extended or adjusted under 35 U.S.C. 154(b) by 167 days.

(21) Appl. No.: 16/461,588

(22) PCT Filed: Mar. 27, 2018

(86) PCT No.: PCT/JP2018/012361
§ 371 (c)(1),
(2) Date: May 16, 2019

(87) PCT Pub. No.: WO2019/186686
PCT Pub. Date: Oct. 3, 2019

(65) Prior Publication Data
US 2020/0269361 A1 Aug. 27, 2020

(51) Int. Cl.
| | |
|---|---|
| *B23K 35/30* | (2006.01) |
| *B23K 35/02* | (2006.01) |
| *B23K 35/40* | (2006.01) |
| *H01M 4/75* | (2006.01) |
| *B23K 101/32* | (2006.01) |
| *B23K 103/08* | (2006.01) |
| *C22C 19/05* | (2006.01) |

(52) U.S. Cl.
CPC ...... *B23K 35/3033* (2013.01); *B23K 35/0266* (2013.01); *B23K 35/402* (2013.01); *H01M 4/75* (2013.01); *B23K 2101/32* (2018.08); *B23K 2103/08* (2018.08); *C22C 19/057* (2013.01)

(58) Field of Classification Search
CPC ... C22C 19/03; C22C 19/051; B23K 35/3033; B23K 35/402; B23K 35/0266
See application file for complete search history.

(56) References Cited

U.S. PATENT DOCUMENTS

2012/0276384 A1 11/2012 Kawamoto et al.
2019/0126408 A1 5/2019 Sagara et al.

FOREIGN PATENT DOCUMENTS

| | | |
|---|---|---|
| CN | 1843683 A | 10/2006 |
| CN | 1993488 A | 7/2007 |
| CN | 101128273 A | 2/2008 |
| CN | 107250417 A | 10/2017 |
| JP | 55-10322 A | 1/1980 |
| JP | 58-196192 A | 11/1983 |
| JP | 62-57796 A | 3/1987 |
| JP | 4-351290 A | 12/1992 |
| JP | 11-277292 A | 10/1999 |
| JP | 2000-263285 A | 9/2000 |
| JP | 2006-272432 A | 10/2006 |
| JP | 2012-115889 A | 6/2012 |
| JP | 5048167 B2 | 10/2012 |
| KR | 10-2013-0016331 A | 2/2013 |
| KR | 10-2016-0024778 A | 3/2016 |
| WO | WO 2017/171050 A1 | 10/2017 |

OTHER PUBLICATIONS

Chinese Office Action and Search Report for counterpart Chinese Application No. 201880004752.1, dated Mar. 23, 2020, with partial English translation.
Korean Notice of Allowance, dated Sep. 5, 2019, for counterpart Korean Application No. 10-2019-7015285, with an English translation.
International Search Report for PCT/JP2018/012361 dated Jun. 26, 2018.
JIS Z 3106, "Methods of radiographic examination for welded joints in stainless steel", 2001, total 151 pages.
JIS Z 3111, "Methods of tension and impact tests for deposited metal", 2005, total 70 pages.
JIS Z 3122, "Methods of bend test for butt welded joint", 2013, total 98 pages.
Office Action for JP 2018-541432 dated Sep. 11, 2018.
Written Opinion of the International Searching Authority for PCT/JP2018/012361 (PCT/ISA/237) dated Jun. 26, 2018.

*Primary Examiner* — Jessee R Roe
(74) *Attorney, Agent, or Firm* — Birch, Stewart, Kolasch & Birch, LLP.

(57) ABSTRACT

A Ni-based alloy core wire for a covered electrode according to an aspect of the invention includes, as a chemical composition, by mass %: C: 0.0100% to 0.0800%; Si: 0.010% to 0.800%; Mn: 0.010% to 1.800%; Mo: 15.0% to 28.0%; W: 2.5% to 8.0%; Cu: 0.10% to 1.20%; Ta: 0.002% to 0.120%; Ni: 65.0% to 82.3%; and a remainder: impurities with other optional selective elements; in which a value X is 0.010% to 0.160%.

8 Claims, 2 Drawing Sheets

NI-BASED ALLOY CORE WIRE FOR COVERED ELECTRODE, COVERED ELECTRODE, AND METHOD OF MANUFACTURING COVERED ELECTRODE

TECHNICAL FIELD OF THE INVENTION

The present invention relates to a Ni-based alloy core wire for a covered electrode, a covered electrode, and a method of manufacturing a covered electrode.

RELATED ART

A demand for liquefied natural gas (LNG), which is an energy source having a low impact on the environment, tends to increase more and more with consideration for global environmental problems. In LNG tanks, 9% Ni steel which is a ferrite-based extremely low temperature material, has been mainly applied as an inner tank material of the LNG tank.

For welding of the 9% Ni steel, a Ni-based alloy welding material having good toughness at extremely low temperatures is widely used. As a covered electrode as a welding material which is used in shielded metal arc welding (SMAW), those containing alloy elements such as Mn, Cr, Mo, W, and Nb in addition to Ni are mainly used.

In recent years, with an increase in size of LNG tanks, the strength and toughness required for the LNG tanks have been increased, and some covered electrodes provided by the related art could not sufficiently satisfy the required performance.

Patent Document 1 proposes a covered electrode of high strength and high toughness, by which a weld metal having excellent cracking resistance and blowhole resistance can be obtained relating to welding of a Ni-based alloy used in welding of 9% Ni steel for an LNG storage tank. However, with the covered electrode described in Patent Document 1, a weld part having a tensile strength of about 690 MPa can be obtained by adding Nb and Ta, but it is difficult to obtain a weld part having a tensile strength of 720 MPa or more that is a recent requirement. In addition, the covered electrode described in Patent Document 1 has a high Nb content. Accordingly, NbC locally melts in a weld metal obtained by the above covered electrode in a case where the weld metal is reheated by multi-pass welding or the like, and thus liquefaction cracking easily occurs. Therefore, the covered electrode described in Patent Document 1 has a problem in cracking resistance.

Patent Document 2 also proposes a Ni-based alloy weld metal which has good cracking resistance and bead appearance, and a Ni-based alloy covered electrode which is used to obtain the Ni-based alloy weld metal and has good welding workability. However, in the Ni-based alloy covered electrode described in Patent Document 2, the contents of Mo and W which are solid solution strengthening elements are low, and thus the tensile strength of the weld metal cannot be increased to satisfy the recent requirement.

PRIOR ART DOCUMENT

Patent Document

[Patent Document 1] Japanese Unexamined Patent Application, First Publication No. 2006-272432

[Patent Document 2] Japanese Unexamined Patent Application, First Publication No. 2012-115889

DISCLOSURE OF THE INVENTION

Problems to be Solved by the Invention

An object of the invention is to provide a Ni-based alloy core wire for a covered electrode by which a weld part having superior low temperature toughness, high elongation, and a high tensile strength can be manufactured, and which has excellent hot-cracking resistance properties and welding workability, a covered electrode, and a method of manufacturing a covered electrode.

Means for Solving the Problem

The gist of the invention is as follows.

(1) According to an aspect of the invention, there is provided a Ni-based alloy core wire for a covered electrode including, as a chemical composition, by mass %: C: 0.0100% to 0.0800%; Si: 0.010% to 0.800%; Mn: 0.010% to 1.800%; Mo: 15.0% to 28.0%; W: 2.5% to 8.0%; Cu: 0.10% to 1.20%; Ta: 0.002% to 0.120%; Ni: 65.0% to 82.3%; Mg: 0% to 0.60%; Al: 0% to 2.20%; Ti: 0% to 2.20%; P: 0.025% or less; S: 0.025% or less; N: 0% to 0.150%; O: 0% to 0.012%; Fe: 0% to 12.0%; Co: 0% to 0.150%; Cr: 0% to 0.150%; V: 0% to 0.150%; Nb: 0% to 0.150%; B: 0% to 0.015%; Bi: 0% to 0.080%; Ca: 0% to 0.025%; REM: 0% to 0.030%; Zr: 0% to 0.150%; and a remainder: impurities, in which a value X defined by Expression 1 is 0.010% to 0.160%.

$$X = [Ta] + 10 \times [REM] : \qquad \text{Expression 1}$$

Here, symbols indicated in Expression 1 are amounts of corresponding elements by unit mass %.

(2) In the Ni-based alloy core wire for a covered electrode according to (1), the value X may be 0.020% to 0.130%.

(3) According to another aspect of the invention, there is provided a covered electrode including: the Ni-based alloy core wire according to (1) or (2); and a covering material which is provided on a surface of the Ni-based alloy core wire.

(4) According to another aspect of the invention, there is provided a method of manufacturing a covered electrode, including: coating a covering material on the Ni-based alloy core wire according to (1) or (2); and baking the Ni-based alloy core wire and the covering material.

(5) According to another aspect of the invention, there is provided a covered electrode manufactured by the method according to (4).

Effects of the Invention

According to the invention, it is possible to provide a Ni-based alloy core wire for a covered electrode by which a weld part having superior low temperature toughness, high elongation, and a high tensile strength can be manufactured, and which has excellent hot-cracking resistance properties and welding workability, a covered electrode, and a method of manufacturing a covered electrode.

EMBODIMENTS OF THE INVENTION

Figure 1:
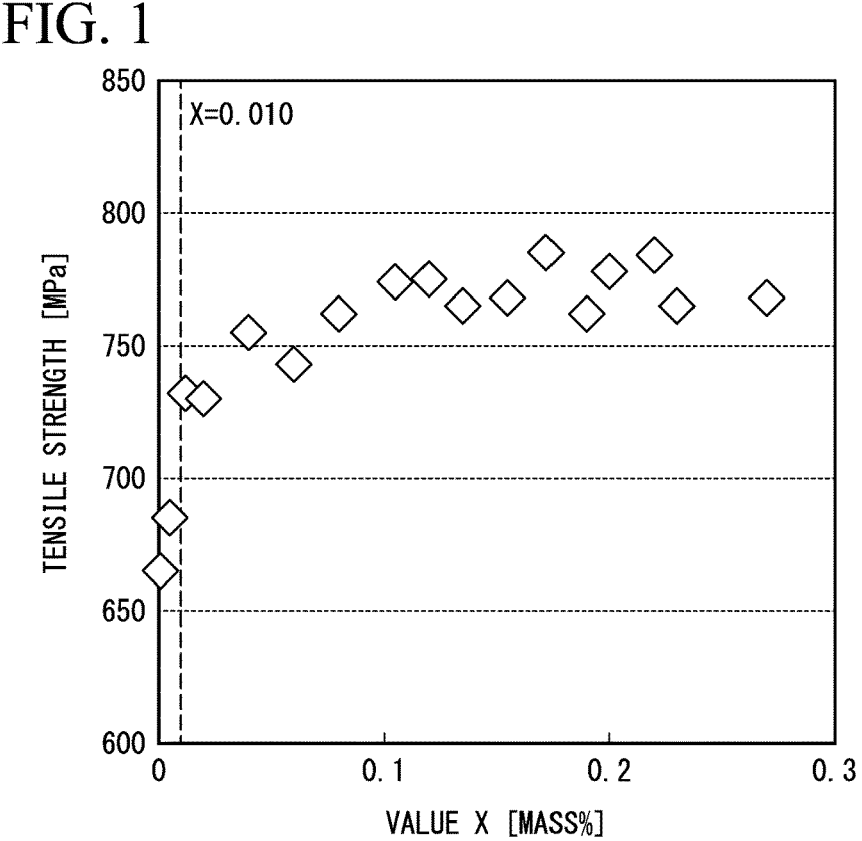
FIG. 1 is a graph showing a relationship between a value X of a Ni-based alloy core wire and a tensile strength of a deposited metal.

The inventors have found that in a case where a covered electrode (hereinafter, abbreviated as "electrode") contains Ta, it is possible to improve both low temperature toughness and a tensile strength of a weld part and to suppress hot-cracking. It is thought that Ta contained in the electrode generates a Ni—Mo—Ta compound and a Ni—W—Ta compound in the weld metal, and the compounds improve the tensile strength of the weld metal by precipitation strengthening.

The problems of the invention are solved by the effects of Ta described above. However, it is thought that in a case where the electrode contains REM as a selective element in addition to Ta, REM refines crystal grains of the weld metal, and thus the low temperature toughness and the strength of the weld metal are further improved. In addition, it is thought that REM contained in the electrode combines with sulfur in the melted metal during welding and reduces the sulfur concentration in the melted metal, thereby further reducing hot-cracking sensitivity.

Hereinafter, a Ni-based alloy core wire for a covered electrode (hereinafter, abbreviated as "core wire"), a covered electrode, and a method of manufacturing a covered electrode according to this embodiment obtained based on the above findings will be described. In this embodiment, "low temperature toughness" means toughness measured at −196° C.

(1. Ni-Based Alloy Core Wire)

Hereinafter, a core wire according to this embodiment will be described. The unit "%" indicating a chemical composition of the core wire means the mass %.

(C: 0.0100% to 0.0800%)

C improves the tensile strength of a weld metal. In a case where the C content is less than 0.0100%, the weld metal does not have a sufficient tensile strength. In a case where the C content exceeds 0.0800%, a carbide precipitates in the weld metal, and the low temperature toughness of the weld metal is impaired. In addition, in this case, the precipitation of a carbide causes a reduction in the ductility and bending performance. Accordingly, the C content is set to 0.0100% to 0.0800%. The lower limit of the C content is preferably 0.0150%, 0.0200%, 0.0250%, or 0.0300%. The upper limit of the C content is preferably 0.0700%, 0.0600%, or 0.0500%.

(Si: 0.010% to 0.800%)

Si suppresses the occurrence of blowholes in a weld metal and improves the defect resistance of the weld metal. In a case where the Si content is less than 0.010%, blowholes easily occur in the weld metal, and defect resistance is impaired. In a case where the Si content exceeds 0.800%, Si segregating at the grain boundary of the weld metal causes micro-cracking and impairs the low temperature toughness of the weld metal. Accordingly, the Si content is set to 0.010% to 0.800%. The lower limit of the Si content is preferably 0.020%, 0.030%, 0.050%, or 0.070%. The upper limit of the Si content is preferably 0.600%, 0.400%, 0.200%, or 0.150%.

(Mn: 0.010% to 1.800%)

Mn improves the cracking resistance of a weld metal. In a case where the Mn content is less than 0.010%, the cracking resistance is deteriorated. In a case where the Mn content exceeds 1.800%, slag peelability is impaired and welding workability is deteriorated. Accordingly, the Mn content is set to 0.010% to 1.800%. The lower limit of the Mn content is preferably 0.080%, 0.140%, 0.200%, 0.300%, or 0.400%. The upper limit of the Mn content is preferably 1.500%, 1.200%, 1.000%, 0.800%, or 0.600%.

(Mo: 15.0% to 28.0%)

Mo improves the tensile strength of a weld metal. In a case where the Mo content is less than 15.0%, the weld metal does not have a sufficient tensile strength. In a case where the Mo content exceeds 28.0%, the low temperature toughness of the weld metal is impaired by excessive hardening of the weld metal. Accordingly, the Mo content is set to 15.0% to 28.0%. The lower limit of the Mo content is preferably 16.0%, 17.0%, 18.0%, or 19.0%. The upper limit of the Mo content is preferably 27.0%, 26.0%, 24.0%, or 22.0%.

(W: 2.5% to 8.0%)

W improves the tensile strength of a weld metal. In a case where the W content is less than 2.50%, the weld metal does not have a sufficient tensile strength. In a case where the W content exceeds 8.00%, a carbide precipitates in the weld metal, and the low temperature toughness of the weld metal is impaired. Accordingly, the W content is set to 2.5% to 8.0%. The lower limit of the W content is preferably 2.7%, 2.9%, 3.2%, or 3.7%. The upper limit of the W content is preferably 7.5%, 6.5%, 6.0%, or 5.5%.

(Cu: 0.10% to 1.20%)

Cu improves the tensile strength of a weld metal. In a case where the Cu content is less than 0.10%, the weld metal does not have a sufficient tensile strength. In a case where the Cu content exceeds 1.20%, Cu segregating at the grain boundary of the weld metal causes micro-cracking and impairs the low temperature toughness of the weld metal. Accordingly, the Cu content is set to 0.10% to 1.20%. The lower limit of the Cu content is preferably 0.15%, 0.20%, 0.25%, or 0.30%. The upper limit of the Cu content is preferably 1.00%, 0.80%, 0.65%, or 0.50%.

(Ta: 0.002% to 0.120%)

Ta is an extremely important element in the core wire according to this embodiment. It is thought that Ta contained in the core wire generates a Ni—Mo—Ta compound and a Ni—W—Ta compound in a weld metal, and the compounds improve the tensile strength of the weld metal by precipitation strengthening. In addition, since Ta forms a carbonitride having a high inciting point, it reduces hot-cracking sensitivity. In order to obtain this effect, it is necessary to set the Ta content to 0.002% or more. In a case where the Ta content exceeds 0.120%, low temperature toughness is deteriorated. In addition, bending ductility is deteriorated due to high-strengthening. Accordingly, the Ta content is set to 0.002% to 0.120%. The lower limit of the Ta content is preferably 0.005%, 0.008%, or 0.012%. The upper limit of the Ta content is preferably 0.100%, 0.080%, 0.065%, or 0.050%.

(Ni: 65.0% to 82.3%)

Ni is a main element of a weld metal, and is an essential element for making an austenitic structure as a structure of the weld metal and securing the tensile strength and toughness of the weld metal at low temperatures (for example, −196° C.). It is necessary to set the Ni content of the core wire to 65.0% or more with consideration for dilution by the base metal (material to be welded). The upper limit of the Ni content is not particularly specified, but substantially about 82.3% with consideration for the amounts of other alloying elements contained in the core wire. Since Ni is an expensive element, the material cost can be reduced by reducing the Ni content. The lower limit of the Ni content is preferably 67.0%, 68.0%, 69.0%, or 70.0%. The upper limit of the Ni content is preferably 80.0%, 78.0%, 76.0%, or 74.0%.

The core wire according to this embodiment may optionally contain selective elements to be described below, in addition to the above-described essential elements. However, since the core wire according to this embodiment can solve the problems without containing the selective elements, the lower limit of each selective element is 0%.

(Mg: 0% to 0.60%)

Mg has a deoxidizing effect and improves the low temperature toughness of a weld metal by reducing the oxygen content of the weld metal, thereby improving defect resistance. Accordingly, the core wire according to this embodiment may contain Mg. In a case where the Mg content exceeds 0.60%, the amount of spatters and fumes increases, and welding workability is deteriorated. Accordingly, the Mg content is set to 0.60% or less. The lower limit of the Mg content is preferably 0.01%, 0.03%, 0.05%, or 0.08%. The upper limit of the Mg content is preferably 0.40%, 0.25%, or 0.15%.

(Al: 0% to 2.20%)

Al has a deoxidizing effect and improves the low temperature toughness of a weld metal by reducing the oxygen content of the weld metal, thereby improving defect resistance. Accordingly, the core wire according to this embodiment may contain Al. In a case where the Al content exceeds 2.20%, a phase (for example, y' phase) which reduces elongation of the weld metal is generated in the weld metal. In addition, in this case, the amount of spatters generated increases and welding workability is deteriorated. Accordingly, the Al content is set to 2.20% or less. The lower limit of the Al content is preferably 0.02%, 0.05%, or 0.10%. The upper limit of the Al content is preferably 2.00%, 1.50%, 1.00%, 0.50%, or 0.30%.

(Ti: 0% to 2.20%)

Ti has a deoxidizing effect and improves the low temperature toughness of a weld metal by reducing the oxygen content of the weld metal, thereby improving defect resistance. Accordingly, the core wire according to this embodiment may contain Ti. In a case where the Ti content exceeds 2.20%, a phase (for example, y' phase) which reduces elongation of the weld metal is generated in the weld metal. Accordingly, the Ti content is set to 2.20% or less. The lower limit of the Ti content is preferably 0.01%, 0.05%, or 0.10%. The upper limit of the Ti content is preferably 2.00%, 1.50%, 1.00%, 0.50%, or 0.30%.

(P: 0.025% or less)

(S: 0.025% or less)

P and S are impurities and impair the low temperature toughness and cracking resistance of a weld metal. Accordingly, the P content and the S content are preferably reduced as much as possible. However, in a case where it is desirable to reduce the cost for removing P and S, 0.025% or less of P and 0.025% or less of S are accepted. The lower limits of the P content and the S content are 0%. The lower limit of the P content is preferably 0.001%, 0.002%, or 0.003%. The upper limit of the P content is preferably 0.015%, 0.010%, 0.008%, or 0.006%. The lower limit of the S content is preferably 0.001%, 0.002%, or 0.003%. The upper limit of the S content is preferably 0.015%, 0.010%, 0.008%, or 0.006%.

(N: 0% to 0.150%)

(O: 0% to 0.012%)

N is solid-solubilized in the austenite phase of a weld metal and increases the strength of the weld metal. Accordingly, the core wire according to this embodiment may contain N. In a case where the N content exceeds 0.150%, pore defects are generated in the weld metal. Accordingly, the N content is set to 0.150% or less. The lower limit of the N content is preferably 0.001%, 0.003%, or 0.005%. The upper limit of the N content is preferably 0.100%, 0.080%, 0.065%, or 0.055%.

O is an impurity and impairs the low temperature toughness of a weld metal. Accordingly, the O content is preferably reduced as much as possible. Although 0 is mixed during welding and impairs the toughness of the weld metal, 0.012% or less of O is accepted. The lower limit of the O content is preferably 0.001%, 0.002%, or 0.003%. The upper limit of the O content is preferably 0.010%, 0.008%, or 0.006%.

(Fe: 0% to 12.0%)

Fe may be contained as impurities during melting the raw material for the core wire. In addition, Fe may be contained in the core wire instead of Ni in order to reduce the material cost by reducing the Ni content. 12.0% or less of Fe is accepted. The lower limit of the Fe content is preferably 0.01%, 0.05%, or 0.1%. The upper limit of the Fe content is preferably 10.0%, 6.0%, or 4.0%.

(Co: 0% to 0.150%)

Co is a precipitation strengthening element. Accordingly, the core wire according to this embodiment may contain Co. In a case where the Co content exceeds 0.150%, toughness is impaired. Accordingly, the Co content is set to 0.150% or less. The lower limit of the Co content is preferably 0.001%, 0.003%, or 0.005%. The upper limit of the Co content is preferably 0.080%, 0.040%, or 0.020%.

(Cr: 0% to 0.150%)

Cr improves the hardenability of a weld metal, thereby improving the tensile strength of the weld metal. Accordingly, the core wire according to this embodiment may contain Cr. In a case where the Cr content exceeds 0.150%, the low temperature toughness of the weld metal is impaired due to excessive hardening of the weld metal. Accordingly, the Cr content is set to 0.150% or less. The lower limit of the Cr content is preferably 0.001%, 0.003%, or 0.005%. The upper limit of the Cr content is preferably 0.080%, 0.040%, or 0.020%.

(V: 0% to 0.150%)

V improves the hardenability of a weld metal, thereby improving the tensile strength of the weld metal. Accordingly, the core wire according to this embodiment may contain V. In a case where the V content exceeds 0.150%, an excessive amount of V carbide precipitates in the weld metal, and thus the weld metal is excessively hardened, and the low temperature toughness of the weld metal is impaired. Accordingly, the V content is set to 0.150% or less. The lower limit of the V content is preferably 0.001%, 0.003%, or 0.005%. The upper limit of the V content is preferably 0.080%, 0.040%, or 0.020%.

(Nb: 0% to 0.150%)

Nb is an element which forms a fine carbide in a weld metal. The fine carbide causes precipitation strengthening in the weld metal, thereby improving the tensile strength of the weld metal. Accordingly, the core wire according to this embodiment may contain Nb. In a case where the Nb content exceeds 0.150%, coarse precipitates are generated in the weld metal, and the low temperature toughness of the weld metal is impaired. Accordingly, the Nb content is set to 0.150% or less. The lower limit of the Nb content is preferably 0.001%, 0.003%, or 0.005%. The upper limit of the Nb content is preferably 0.080%, 0.040%, or 0.020%.

(B: 0% to 0.015%)

B combines with a solute N to form BN in a weld metal, and has an effect of reducing an adverse effect of the solute N on the toughness of the weld metal. In addition, B improves the hardenability of the weld metal, thereby improving the tensile strength of the weld metal. Accordingly, the core wire according to this embodiment may contain B. In a case where the B content exceeds 0.015%, coarse BN and a B compound such as $Fe_{23}(C,B)_6$ is generated in the weld metal, and the low temperature toughness of the weld metal is impaired. Accordingly, the B content is set to 0.015% or less. The lower limit of the B content is preferably 0.0001%, 0.005%, or 0.001%. The upper limit of the B content is preferably 0.008%, 0.005%, or 0.003%.

(Bi: 0% to 0.080%)

Bi improves the peelability of slag. Accordingly, the core wire according to this embodiment may contain Bi. In a case where the Bi content exceeds 0.080%, solidification cracking easily occurs in a weld metal. Accordingly, the Bi content is set to 0.080% or less. The lower limit of the Bi content is preferably 0.0001%, 0.0005%, or 0.001%. The upper limit of the Bi content is preferably 0.050%, 0.025%, or 0.010%.

(Ca: 0% to 0.025%)

Ca changes the structure of a sulfide in a weld metal, and also reduces the sizes of a sulfide and an oxide, thereby improving the low temperature toughness of the weld metal. In addition, since Ca is very likely to be ionized in the arc, it stabilizes the arc. Accordingly, the core wire according to this embodiment may contain Ca. In a case where the Ca content exceeds 0.025%, the amount of spatters increases and welding workability is deteriorated. Accordingly, the Ca content is set to 0.025% or less. The lower limit of the Ca content is preferably 0.0001%, 0.0005%, or 0.001%. The upper limit of the Ca content is preferably 0.015%, 0.010%, or 0.005%.

(REM: 0% to 0.030%)

The term "REM" refers to the total of 17 elements consisting of Sc, Y, and lanthanoid, and the "REM content" means the total content of the 17 elements. In a case where lanthanoid is used as REM, industrially, REM is added in the form of misch metal.

In a case where REM is contained in addition to Ta in the electrode, crystal grains of the weld metal are further refined, and thus the low temperature toughness and strength of the weld metal are further improved. In addition, REM forms a sulfide in the melted metal during welding and reduces the S concentration in the melted metal, thereby suppressing the occurrence of hot-cracking. Accordingly, the core wire according to this embodiment preferably contains REM. In a case where the REM content exceeds 0.030%, the arc becomes unstable, welding defects and micro-defects are generated in the weld metal, and thus the ductility of the weld metal is impaired. Accordingly, the REM content is set to 0.030% or less. The lower limit of the REM content is preferably 0.0001%, 0.0005%, or 0.001%. The upper limit of the REM content is preferably 0.020%, 0.010%, or 0.006%.

(Zr: 0% to 0.150%)

Zr is a precipitation strengthening element. Accordingly, the core wire according to this embodiment may contain Zr. In a case where the Zr content exceeds 0.150%, toughness and bending performance are impaired. Accordingly, the Zr content is set to 0.150% or less. The lower limit of the Zr content is preferably 0.0001%, 0.0005%, or 0.001%. The upper limit of the Zr content is preferably 0.080%, 0.030%, or 0.010%.

(Remainder: Impurities)

The chemical composition of the core wire according to this embodiment contains the above elements and the remainder. The remainder includes impurities. The impurities are elements mixed from the raw materials such as ore or scrap during industrially manufacturing the core wire, or elements mixed by various factors in the manufacturing steps, and mean those which are acceptable within a range not adversely affecting the core wire according to this embodiment.

(Value X: 0.010% to 0.160%)

In the core wire according to this embodiment, it is necessary that a value X calculated by the following Expression 1 is set to 0.010% to 0.160%.

$$X=[Ta]+10\times[REM] \qquad \text{Expression 1}$$

Symbols indicated in Expression 1 are amounts of corresponding elements by unit mass %. In a case where the REM content is 0% by unit mass %, 0 is substituted for "REM" of Expression 1.

Figure 2:
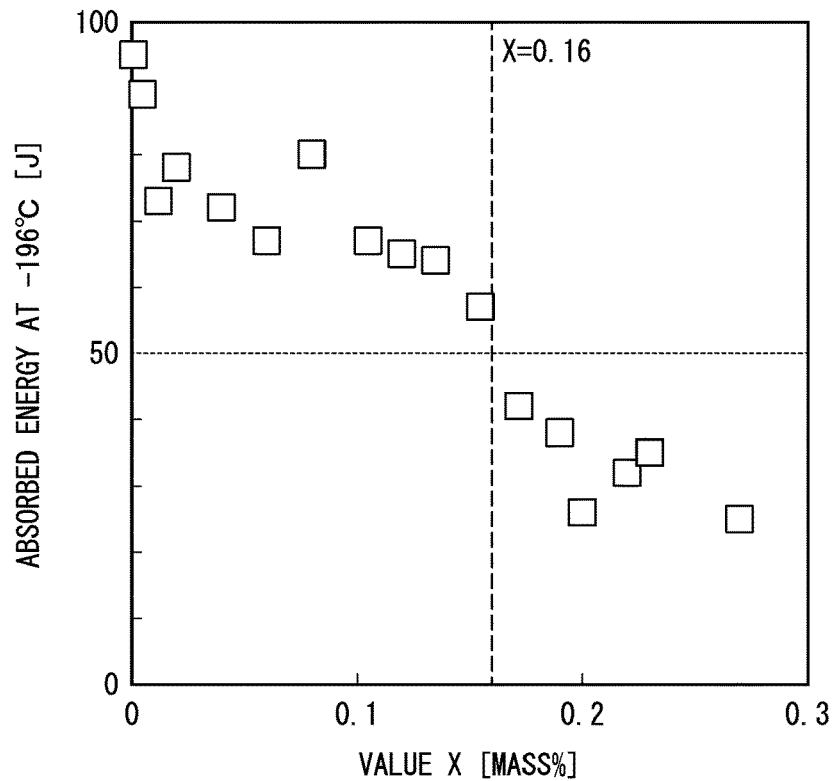
FIG. 2 is a graph showing a relationship between a value X of a Ni-based alloy core wire and low temperature toughness of a deposited metal.

The inventors manufactured deposited metals using electrodes manufactured from various core wires different in Ta content and REM content, and examined the tensile strength and low temperature toughness of the deposited metals collected from the deposited metals. Here, 9%-Ni steel was applied as a base metal. Welding conditions were set as follows: the welding was performed in a flat position with no preheating at a welding current of 140 A to 160 A, a welding voltage of 10 V to 15 V, a welding rate of 5 cm/min to 10 cm/min, and an interpass temperature of 150° C. or less. The tensile strength and toughness of the deposited metal were evaluated by JIS Z 3111 (2005) "methods of tension and impact tests for deposited metal". As a result of the tests, it has been found that the tensile strength of the deposited metal cannot be secured in a case where the value X is less than 0.010% as shown in FIGS. 1 and 2. It has been found that the Charpy absorbed energy (low temperature toughness) of the deposited metal at −196° C. is impaired in a case where the value X exceeds 0.160% as shown in FIG. 2. In addition, it has been found that bending ductility is deteriorated due to high-strengthening. That is, the inventors have found that both high-strengthening of the weld metal and securing superior low temperature toughness are realized by setting the value X within a range of 0.010% to 0.160%. The inventors have also found that the hot-cracking resistance properties and bending performance of the weld metal are also improved by setting the value X within the above range. The lower limit of the value X is preferably 0.020%, 0.030%, 0.040%, or 0.050%. The upper limit of the value X is preferably 0.130%, 0.120%, 0.110%, or 0.100%.

The reason why the above-described phenomena occur according to the value X is presumed to be as described below. Ta generates an intermetallic compound (Ni—Mo—Ta compound, Ni—W—Ta compound, and the like) in the weld metal, and thus causes precipitation strengthening and contributes to high-strengthening of the weld metal. In a case where both Ta and REM are contained in the electrode, these contribute to further high-strengthening of the weld metal by refining the solidification structure of the weld metal. In addition, since Ta forms a carbonitride silicide, formation of a low melting point compound is suppressed, and as a result, hot-cracking is suppressed. In addition, REM is thought to refine crystal grains of the weld metal, thereby further improving the low temperature toughness and strength of the weld metal. In addition, REM forms a sulfide in the melted metal during welding and reduces the S concentration in the melted metal, thereby suppressing the occurrence of hot-cracking. Accordingly, it is thought that in a case where the value X is insufficient, the weld metal does not have a sufficient tensile strength and the hot-cracking occurrence rate increases. In a case where REM is excessively contained, it is thought that the arc becomes unstable, welding defects and micro-defects are generated in the weld metal, and thus the ductility of the weld metal is decreased. However, it is possible to suppress hot-cracking and improve the tensile strength only with Ta, and the REM content may be 0% as described above as long as the value X specified as described above is satisfied.

The method of manufacturing a core wire according to this embodiment is not particularly limited. For example, an alloy having the same chemical composition as that of the core wire according to this embodiment described above and satisfying the value X of the core wire according to this embodiment specified as described above is melted and subjected to wire-drawing, and thus the core wire according to this embodiment can be obtained. The diameter of the core wire is also not particularly limited, and may be set to a value similar to that of the core wire for a usual covered electrode. In addition, there is no need for the chemical composition of the core wire to be uniform, and for example, the core wire may have Cu plating or the like on a surface thereof. In a case where the average chemical composition of the core wire and the value X calculated therefrom are within the above ranges, the core wire is melted during welding, and exhibits the above-described effects.

The diameter of the core wire may be 2.0 mm to 6.0 mm. Generally, the diameter of the core wire is 3.0 mm to 5.0 mm in many cases. Accordingly, the lower limit of the diameter of the core wire may be 3.0 mm. The upper limit of the diameter of the core wire may be 5.0 mm. The length of the core wire may be 200 mm to 500 mm. Generally, the length of the core wire is 300 mm to 400 mm in many cases. Accordingly, the lower limit of the length of the core wire may be 300 mm. The upper limit of the length of the core wire may be 400 mm.

(2. Covered Electrode)

Next, a covered electrode according to this embodiment will be described below. The covered electrode according to this embodiment includes a Ni-based alloy core wire according to this embodiment and a covering material provided on a surface of the Ni-based alloy core wire. The type of the covering material is not particularly limited, and a known covering material for a covered electrode may be used. That is, using the same raw material for a covering material as a known covering material for a covered electrode, the covered electrode according to this embodiment may be manufactured by covering the covering material on the Ni-based alloy core wire through the same method.

Regarding the covered electrode according to this embodiment, there is no need to exclude covering materials which have not been publicly known. In many cases, those skilled in the art may experimentally produce a covered electrode, in which the core wire according to this embodiment is covered with a covering material which has not been publicly known, before manufacturing and selling the covered electrode, and perform a performance evaluation test so as not to employ a covering material having poor properties but to employ only a covering material having good properties. In a case where such procedures are carried out, no problems arise even in a case where the core wire according to this embodiment is covered with a newly developed covering material (which has not been publicly known).

The covering material usually contains a non-metallic substance. Examples of the non-metallic substance include oxides such as $TiO_2$ and $SiO_2$, carbonates such as $CaCO_3$, and fluorides such as $CaF_2$, $MgF_2$, $LiF$, $NaF$, $K_2ZrF_6$, $BaF_2$, $K_2SiF_6$, $Na_3AlF_6$, and $AlF_3$. These non-metallic substances have effects such as improvement of welding workability and stabilization of a weld metal shape. However, most of them are discharged outside the weld metal as slag during welding, and thus do not have a substantial influence on the elements of the weld metal obtained by welding. Since the covered electrode according to this embodiment secures the properties of the weld metal by the chemical composition and the value X of the core wire, the elements of the covering material can be optionally selected based on usual knowledge in the technical field of shielded metal arc welding.

It is difficult to specify elements which are non-metallic substances of the covering material by analysis. It is not easy to determine whether an element such as Ti, Si, Na, and Ca contained as a non-metallic substance exists in the form of metal or alloy, oxide, fluoride, or carbonate in the covering material. For example, it is difficult to separate Si (metal Si) existing as a metal or an alloy from Si existing as an oxide ($SiO_2$). This is because a method of selectively dissolving only a metal Si to subject the metal Si to wet analysis has not been established. In addition, a carbonate is thermally decomposed easily during analysis, and thus it is also difficult to accurately specify the type of carbonate. However, it is possible to estimate the carbonate content from the amount of $CO_2$ liberated from the covering material and the like. In a case where a fluoride is contained in the covering material, the fluorine liberated from the covering material may damage the analytical instrument. Furthermore, the method of manufacturing a covered electrode may include a step of baking the core wire coated with the covering material, and the baking may unexpectedly change the composition of the non-metallic substances of the covering material.

The covering material may contain a metallic substance (that is, a metallic powder composed of a single metal element excluding an oxide, a carbonate, a fluoride, and the like, an alloy powder composed of an alloy of a plurality of metal elements, etc.). The metallic substance in the covering material is melted during welding and exhibits the same effect as the metal constituting the core wire. C and Si may be contained as metallic substances in the covering material, and representative examples of other elements which may be contained include Mn, Ni, Cr, Mo, and Fe. A covering material containing Ta is not a known covering material, but an element Ta may be contained in the metallic substance. The covered electrode according to this embodiment is a covered electrode obtained by a method of manufacturing a covered electrode according to this embodiment to be described later.

Many known (existing) covered electrodes have a coverage of 20% to 40%. The covered electrode according to this embodiment may have a coverage of about 20% to 40%. The coverage is defined by Expression A.

Coverage=$(W_e-W_w)/W_e$:          Expression A

In Expression A, $W_e$ represents a total mass of the electrode, and $W_w$ represents a total mass of the core wire.

(3. Method of Manufacturing Covered Electrode)

Next, a method of manufacturing a covered electrode according to this embodiment will be described below.

The method of manufacturing a covered electrode according to this embodiment includes a step of coating a covering material on a Ni-based alloy core wire according to this embodiment and a step of baking the Ni-based alloy core wire and the covering material.

The method may be optionally selected among covering material methods which have been performed by those skilled in the art based on usual knowledge in the technical field of shielded metal arc welding, such that the type of the covering material is not particularly limited as described above.

There is no need to limit various manufacturing conditions such as baking conditions in the method of manufacturing a covered electrode according to this embodiment to conditions which have been employed by those skilled in the art. In many cases, before employing a new method, those skilled in the art may experimentally produce a covered electrode by the method, and perform a performance evaluation test so as not to employ a method having poor properties and productivity but to employ a method having good properties and productivity. In a case where such procedures are carried out, a method which have not been performed may be employed. For example, in the method of manufacturing a covered electrode, the baking temperature is about 150° C. to 450° C. and the baking time is about 0.1 hours to 3 hours in many cases. However, there is no need to limit the baking temperature and the baking time to these ranges.

EXAMPLES

Ni-based alloy core wires for a covered electrode having elements shown in Tables 1-1 to 2-2 were manufactured. These were coated with a covering material having elements shown in Table 3 and baked to manufacture covered electrodes. The baking temperature was 410° C. and the baking time was 23 minutes. Regarding the core wire sizes used in the test, the diameter was 4.0 mm, and the length was 350 mm. These covered electrodes were evaluated as follows. In Tables 1-1 to 2-2, the values out of the range of the core wire according to this embodiment were underlined. The content of an element not added to the core wire was not described in the table and made blank. The remainder of the elements of the core wires disclosed in Tables 1-1 to 2-2 consisted of impurities.

For each test, 9%-Ni steel having components shown in Table 9 was applied as a base metal. Welding conditions were set as follows: the welding was performed in a flat position with no preheating at a welding current of 140 A to 160 A, a welding voltage of 10 V to 15 V, a welding rate of 5 cm/min to 10 cm/min, and an interpass temperature of 150° C. or less as shown in Table 6. As evaluation for deposited metal performance, a tensile test and an impact test (a base metal AA1 shown in Table 9 was used) were performed according to JIS Z 3111 (2005). A sample by which a deposited metal having a tensile strength of 720 MPa or more, elongation of 25% or more, and absorbed energy $vE_{-196°\,C.}$ of 55 J or more at −196° C. could be manufactured was judged to be good in deposited metal performance.

Figure 3:
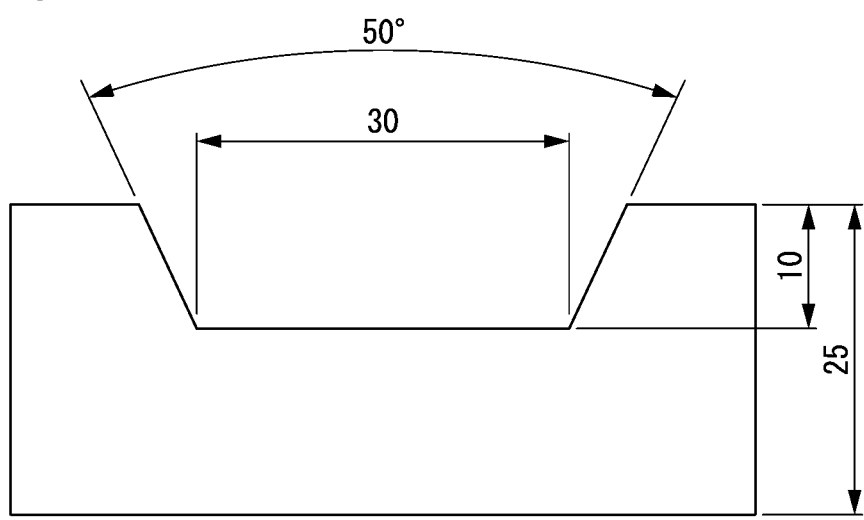
FIG. 3 is a diagram showing a welding test sheet used for evaluation of examples of the invention.

To examine cracking resistance, 9%-Ni steel (a base metal AA2 shown in Table 9 was used) was applied as a base metal, a groove was formed as shown in FIG. 3, 500 mm multi-pass welding was performed under the same welding conditions as described above, a penetrant test was performed by conducting grinding three times by about 1 mm from a final bead surface, and whether cracking occurred was determined. Samples in which no cracking was found were judged to be good in cracking resistance.

Bending performance was evaluated by the following means. A longitudinal bending test piece was collected from the weld metal according to JIS Z 3122 (2013) "methods of bend test for butt welded joint", and a thickness (t) of the test piece was reduced to 10 mm from the back side. The test piece was subjected to bending with a bend radius R of 1.0×t mm, and then the presence or absence of cracking in the test piece was visually confirmed to evaluate the bending performance. An example in which no cracking was visually confirmed in the test piece was judged to be good in bendability.

To examine defect resistance, welding was performed with the same base metal, groove conditions, and welding conditions as in the cracking resistance test shown in FIG. 3, and on the weld part, an X-ray transmission test was performed for judgement with class classification of JIS Z 3106 (2001). A sample by which the weld part judged as Class 1 could be manufactured was judged to be good in defect resistance. The deposited metal test and the examination of blowhole resistance were performed at a welding current of 140 A.

In the welding workability evaluation, horizontal fillet welding was performed using 9%-Ni steel (a base metal AA1 shown in Table 9 was used) as a base metal, and arc stability, the amount of spatters generated, slag peelability, and bead appearance were examined. Welding conditions were set as follows: the welding was performed at a welding current of 140 A and a welding rate of 10 cm/min. Regarding the arc stability, a core wire in which the arc extinguishing time was 10% or less of a total arc generation time was judged to be acceptable. Regarding the amount of spatters generated, a core wire in which no spatters were generated, or a core wire in which spatters were generated, but it was possible to remove the spatters adhering to the base metal by light rubbing with a wire brush or the like was judged to be acceptable. Regarding the slag peelability, a core wire in which slag to be peeled off naturally was formed, or a core wire in which slag to be peeled off in a case where a weld was tapped lightly with a wire brush or a chisel was formed was judged to be acceptable. A core wire in which slag which was not peeled off even by brushing with a great effort using a wire brush or rubbing with a great effort using a chisel was formed was judged to be unacceptable with regard to the slag peelability. Regarding the bead appearance, a core wire in which defects such as blowholes occurred so as to appear on a bead surface, a core wire in which a convex-concave portion depth of a bead surface was 10% or more of an excess weld metal height, or a core wire in which a toe angle of a bead toe portion was 90° or more was judged to be unacceptable, and other core wires were judged to be acceptable.

Tables 4 and 5 show the combination of the core wire with the covering material and the coverage. Tables 7 and 8 show the results of the core wire tests. In Tables 7 and 8, the numerical values that did not satisfy the above-described acceptance criteria were underlined.

TABLE 1-1

| | | C | Si | Mn | Mo | W | Cu | Ta | Ni | Mg | Al | Ti | P | S | N | O |
|---|---|---|---|---|---|---|---|---|---|---|---|---|---|---|---|---|
| Invention | A1 | 0.0150 | 0.041 | 0.350 | 18.0 | 3.2 | 0.55 | 0.011 | 77.7 | | | 0.06 | 0.010 | 0.003 | 0.003 | 0.004 |
| Examples | A2 | 0.0730 | 0.084 | 0.525 | 18.3 | 2.9 | 0.42 | 0.064 | 67.4 | | 0.04 | 0.01 | 0.005 | 0.005 | 0.015 | 0.007 |
| | A3 | 0.0430 | 0.016 | 0.450 | 21.5 | 4.1 | 0.21 | 0.022 | 73.5 | 0.05 | | | 0.003 | 0.011 | 0.043 | 0.003 |

TABLE 1-1-continued

|    | C | Si | Mn | Mo | W | Cu | Ta | Ni | Mg | Al | Ti | P | S | N | O |
|---|---|---|---|---|---|---|---|---|---|---|---|---|---|---|---|
| A4 | 0.0210 | 0.750 | 0.985 | 18.8 | 3.6 | 0.62 | 0.011 | 75.1 | | | | 0.004 | 0.008 | 0.067 | 0.001 |
| A5 | 0.0300 | 0.030 | 0.040 | 20.0 | 3.1 | 0.75 | 0.050 | 74.7 | | 0.02 | 0.09 | 0.001 | 0.001 | 0.001 | 0.002 |
| A6 | 0.0150 | 0.085 | 1.750 | 17.6 | 2.8 | 0.36 | 0.080 | 77.2 | | | | 0.001 | 0.011 | 0.083 | 0.003 |
| A7 | 0.0470 | 0.070 | 0.460 | 15.3 | 3.5 | 0.74 | 0.042 | 77.9 | | | 1.86 | 0.008 | 0.005 | 0.004 | 0.004 |
| A8 | 0.0360 | 0.045 | 0.265 | 24.8 | 3.3 | 0.20 | 0.068 | 70.9 | | | 0.22 | 0.011 | 0.004 | 0.083 | 0.009 |
| A9 | 0.0280 | 0.150 | 0.438 | 22.1 | 2.7 | 0.32 | 0.067 | 69.5 | 0.03 | 0.95 | 0.07 | 0.020 | 0.011 | 0.011 | 0.008 |
| A10 | 0.0157 | 0.335 | 0.246 | 20.0 | 7.6 | 0.23 | 0.019 | 69.5 | | | 1.89 | 0.006 | 0.013 | 0.055 | 0.007 |
| A11 | 0.0228 | 0.013 | 0.267 | 18.5 | 3.2 | 0.44 | 0.005 | 77.4 | | | | 0.005 | 0.006 | 0.044 | 0.006 |
| A12 | 0.0364 | 0.074 | 0.445 | 23.1 | 5.3 | 0.31 | 0.110 | 69.4 | | | 1.11 | 0.002 | 0.006 | 0.031 | 0.003 |
| A13 | 0.0214 | 0.145 | 0.905 | 18.9 | 6.1 | 0.28 | 0.011 | 73.5 | | | | 0.003 | 0.005 | 0.065 | 0.004 |
| A14 | 0.0198 | 0.098 | 0.173 | 20.7 | 5.3 | 0.25 | 0.018 | 71.1 | 0.55 | 1.65 | | 0.007 | 0.004 | 0.087 | 0.006 |
| A15 | 0.0110 | 0.056 | 0.365 | 18.6 | 2.9 | 1.12 | 0.005 | 72.0 | | | 0.35 | 0.002 | 0.011 | 0.062 | 0.004 |
| A16 | 0.0250 | 0.035 | 0.456 | 22.3 | 3.8 | 0.34 | 0.049 | 72.8 | | | | 0.012 | 0.020 | 0.008 | 0.003 |
| A17 | 0.0340 | 0.087 | 0.412 | 22.3 | 5.7 | 0.71 | 0.008 | 70.5 | | 0.07 | | 0.003 | 0.004 | 0.006 | 0.011 |
| A18 | 0.0156 | 0.140 | 0.185 | 20.8 | 4.3 | 0.63 | 0.060 | 73.2 | | | 0.45 | 0.002 | 0.005 | 0.042 | 0.004 |
| A19 | 0.0412 | 0.037 | 0.284 | 19.6 | 6.6 | 0.36 | 0.055 | 72.7 | 0.15 | | 0.07 | 0.004 | 0.008 | 0.095 | 0.006 |
| A20 | 0.0247 | 0.025 | 0.226 | 19.4 | 5.2 | 0.28 | 0.012 | 74.4 | | 0.26 | | 0.007 | 0.003 | 0.141 | 0.003 |
| A21 | 0.0310 | 0.074 | 0.556 | 20.6 | 3.1 | 0.33 | 0.004 | 73.6 | | | | 0.004 | 0.004 | 0.085 | 0.004 |
| A22 | 0.0140 | 0.165 | 0.646 | 22.2 | 4.4 | 0.45 | 0.055 | 70.7 | | | 1.06 | 0.006 | 0.013 | 0.060 | 0.003 |
| A23 | 0.0440 | 0.110 | 0.856 | 21.9 | 6.1 | 0.34 | 0.045 | 70.5 | | | | 0.008 | 0.009 | 0.030 | 0.002 |
| A24 | 0.0350 | 0.068 | 0.090 | 20.4 | 3.7 | 0.77 | 0.040 | 74.8 | | | | 0.004 | 0.006 | 0.047 | 0.007 |

TABLE 1-2

|  |  | Fe | Co | Cr | V | Nb | B | Bi | Ca | REM | Zr | value X |
|---|---|---|---|---|---|---|---|---|---|---|---|---|
| Invention Examples | A1 | | | 0.021 | | 0.008 | 0.001 | | | | | 0.011 |
|  | A2 | 10.0 | 0.010 | 0.052 | 0.012 | 0.003 | 0.003 | 0.010 | 0.005 | 0.006 | 0.003 | 0.124 |
|  | A3 | | | | | | | 0.075 | | | | 0.022 |
|  | A4 | | | | | | | | | | | 0.011 |
|  | A5 | 1.1 | 0.007 | 0.010 | 0.005 | 0.007 | 0.002 | 0.003 | 0.001 | 0.008 | 0.004 | 0.130 |
|  | A6 | | | | | | | | | | | 0.080 |
|  | A7 | | 0.003 | | | 0.012 | | | | | | 0.042 |
|  | A8 | | | | 0.030 | | | | 0.015 | | | 0.068 |
|  | A9 | 3.6 | | | | 0.008 | | | | | 0.010 | 0.067 |
|  | A10 | | | 0.065 | | | | | | | | 0.019 |
|  | A11 | | | | 0.080 | | | 0.033 | | 0.011 | | 0.115 |
|  | A12 | | | 0.040 | | | | | 0.002 | | | 0.110 |
|  | A13 | | 0.040 | | | 0.030 | | | | | | 0.011 |
|  | A14 | | | | | | 0.006 | | | | | 0.018 |
|  | A15 | 4.3 | 0.011 | 0.065 | 0.024 | 0.008 | 0.003 | 0.041 | 0.003 | 0.015 | 0.003 | 0.155 |
|  | A16 | | | 0.125 | | | | | | | | 0.049 |
|  | A17 | | | | 0.120 | | | | | 0.005 | | 0.058 |
|  | A18 | | 0.030 | | | 0.130 | | | | | | 0.060 |
|  | A19 | | | | | 0.013 | | | | | | 0.055 |
|  | A20 | | | | 0.036 | | | 0.004 | 0.022 | | | 0.012 |
|  | A21 | 1.6 | | 0.033 | | | 0.011 | | | 0.015 | | 0.154 |
|  | A22 | | | | | 0.090 | | | | | 0.130 | 0.055 |
|  | A23 | | 0.066 | | | | | | 0.004 | | | 0.045 |
|  | A24 | | | | | | | 0.009 | | | | 0.040 |

TABLE 2-1

|  |  | C | Si | Mn | Mo | W | Cu | Ta | Ni | Mg | Al | Ti | P | S | N | O |
|---|---|---|---|---|---|---|---|---|---|---|---|---|---|---|---|---|
| Comparative Examples | B1 | 0.0430 | 0.405 | 0.865 | 18.4 | 4.1 | 0.87 | <u>0.001</u> | 69.6 | | | 1.26 | 0.018 | 0.005 | 0.013 | 0.008 |
|  | B2 | 0.0320 | 0.355 | 0.563 | 19.9 | 3.9 | 0.22 | <u>0.136</u> | 74.7 | | | | 0.005 | 0.003 | 0.008 | 0.001 |
|  | B3 | 0.0520 | 0.235 | 0.245 | 18.1 | 5.3 | 0.47 | 0.005 | 73.3 | | 0.02 | | 0.006 | 0.006 | 0.033 | 0.010 |
|  | B4 | 0.0180 | 0.030 | 0.456 | 21.8 | 6.1 | 0.87 | 0.008 | 68.7 | | 0.14 | 0.68 | 0.008 | 0.018 | 0.067 | 0.003 |
|  | B5 | 0.0470 | 0.055 | 0.650 | 20.5 | 5.3 | 0.68 | 0.060 | 70.4 | | 0.45 | | 0.013 | 0.005 | 0.087 | 0.008 |
|  | B6 | 0.0330 | 0.367 | 0.560 | 18.5 | 5.5 | 0.32 | 0.006 | 74.2 | 0.20 | | | 0.007 | 0.003 | | |
|  | B7 | 0.0650 | 0.078 | 0.870 | 24.6 | 6.2 | 0.21 | 0.080 | 67.3 | | | 0.55 | 0.004 | 0.003 | 0.005 | |

TABLE 2-2

|  |  | Fe | Co | Cr | V | Nb | B | Bi | Ca | REM | Zr | value X |
|---|---|---|---|---|---|---|---|---|---|---|---|---|
| Comparative Examples | B1 | 4.3 | | 0.008 | 0.011 | 0.032 | 0.004 | 0.043 | 0.004 | 0.011 | 0.022 | 0.111 |
|  | B2 | | 0.072 | 0.023 | | 0.072 | | | 0.016 | | | 0.136 |
|  | B3 | 2.1 | 0.008 | | | 0.004 | | | | <u>0.031</u> | 0.032 | <u>0.315</u> |
|  | B4 | 0.9 | 0.013 | 0.011 | 0.124 | 0.023 | 0.003 | 0.009 | 0.019 | | | <u>0.008</u> |

TABLE 2-2-continued

|    | Fe  | Co | Cr    | V     | Nb    | B     | Bi    | Ca    | REM   | Zr    | value X |
|----|-----|----|-------|-------|-------|-------|-------|-------|-------|-------|---------|
| B5 | 1.6 |    | 0.041 | 0.008 | 0.054 | 0.007 | 0.016 | 0.022 | 0.011 | 0.023 | 0.170   |
| B6 | 0.3 |    | 0.050 |       |       |       |       |       |       |       | 0.006   |
| B7 |     |    |       |       |       |       |       |       | 0.010 |       | 0.180   |

TABLE 3

| Covering Material No. | TiO$_2$ | SiO$_2$ | CaCO$_3$ | Other Metal Oxides | F-Equivalent Value | C | Si | Mn | Ni | Cr | Mo | Fe | Remainder |
|---|---|---|---|---|---|---|---|---|---|---|---|---|---|
| C1 | 1.00 | 9.70 | 45.0 | 0.5 | 8.4 | 0.02 | 1.30 | 2.00 |      |      | 3.00 | 1.50 | 27.6 |
| C2 | 4.80 | 5.60 | 42.0 | 0.5 | 5.4 | 0.01 | 0.21 | 0.32 | 3.00 | 0.20 | 3.00 | 2.00 | 33.0 |
| C3 | 3.30 | 7.50 | 35.0 | 0.8 | 9.5 | 0.04 | 1.34 | 2.22 | 2.70 |      | 3.60 | 4.00 | 30.0 |

TABLE 4

|  | Core Wire No. | Covering Material No. | Coverage [%] |
|---|---|---|---|
| Invention Examples | A1 | C1 | 23 |
| | A2 | C1 | 30 |
| | A3 | C1 | 38 |
| | A4 | C2 | 22 |
| | A5 | C2 | 30 |
| | A6 | C2 | 37 |
| | A7 | C3 | 25 |
| | A8 | C3 | 33 |
| | A9 | C3 | 40 |
| | A10 | C1 | 25 |
| | A11 | C1 | 30 |
| | A12 | C1 | 35 |
| | A13 | C1 | 25 |
| | A14 | C1 | 30 |
| | A15 | C2 | 35 |
| | A16 | C2 | 25 |
| | A17 | C2 | 30 |
| | A18 | C2 | 30 |
| | A19 | C2 | 25 |
| | A20 | C2 | 30 |
| | A21 | C3 | 35 |
| | A22 | C3 | 25 |
| | A23 | C3 | 30 |
| | A24 | C3 | 30 |

TABLE 5

|  | Core Wire No. | Covering Material No. | Coverage [%] |
|---|---|---|---|
| Comparative Examples | B1 | C3 | 35 |
| | B2 | C3 | 25 |
| | B3 | C2 | 33 |
| | B4 | C3 | 30 |
| | B5 | C3 | 29 |
| | B6 | C1 | 25 |
| | B7 | C1 | 26 |

TABLE 6

| Welding Current [A] | Welding Voltage [V] | Welding Rate [cm/min] | Preheating [° C.] | Interpass Temperature [° C.] |
|---|---|---|---|---|
| 140 to 160 | 10 to 15 | 5 to 10 | none | 150° C. or less |

TABLE 7

| | | Deposited Metal Performance | | | | Welding Workability Evaluation | | | | |
|---|---|---|---|---|---|---|---|---|---|---|
| | | Tensile Performance | | Impact | | | | | | |
| | Core Wire No. | Tensile Strength MPa | Elongation % | Performance vE$_{-196° C.}$ J | Presence or Absence of Cracking | Bending Performance | Arc Stability | Amount of Spatters Generated | Slag Peelability | Bead Appearance | Synthetic Judgement |
| Invention Examples | A1 | 725 | 52 | 102 | None | Good | Good | Good | Good | Good | Acceptable |
| | A2 | 820 | 44 | 75 | None | Good | Good | Good | Good | Good | Acceptable |
| | A3 | 795 | 48 | 69 | None | Good | Good | Good | Good | Good | Acceptable |
| | A4 | 735 | 50 | 98 | None | Good | Good | Good | Good | Good | Acceptable |
| | A5 | 765 | 49 | 81 | None | Good | Good | Good | Good | Good | Acceptable |
| | A6 | 724 | 53 | 95 | None | Good | Good | Good | Good | Good | Acceptable |
| | A7 | 735 | 51 | 87 | None | Good | Good | Good | Good | Good | Acceptable |
| | A8 | 794 | 45 | 72 | None | Good | Good | Good | Good | Good | Acceptable |
| | A9 | 741 | 48 | 88 | None | Good | Good | Good | Good | Good | Acceptable |
| | A10 | 805 | 46 | 70 | None | Good | Good | Good | Good | Good | Acceptable |
| | A11 | 733 | 52 | 101 | None | Good | Good | Good | Good | Good | Acceptable |
| | A12 | 801 | 46 | 69 | None | Good | Good | Good | Good | Good | Acceptable |
| | A13 | 748 | 49 | 71 | None | Good | Good | Good | Good | Good | Acceptable |

TABLE 7-continued

| | Deposited Metal Performance | | | | | Welding Workability Evaluation | | | | |
|---|---|---|---|---|---|---|---|---|---|---|
| | Tensile Performance | | Impact | | | | | | | |
| Core Wire No. | Tensile Strength MPa | Elongation % | Performance $vE_{-196°C.}$ J | Presence or Absence of Cracking | Bending Performance | Arc Stability | Amount of Spatters Generated | Slag Peelability | Bead Appearance | Synthetic Judgement |
| A14 | 754 | 50 | 83 | None | Good | Good | Good | Good | Good | Acceptable |
| A15 | 768 | 48 | 72 | None | Good | Good | Good | Good | Good | Acceptable |
| A16 | 746 | 51 | 75 | None | Good | Good | Good | Good | Good | Acceptable |
| A17 | 755 | 46 | 67 | None | Good | Good | Good | Good | Good | Acceptable |
| A18 | 769 | 45 | 70 | None | Good | Good | Good | Good | Good | Acceptable |
| A19 | 782 | 45 | 72 | None | Good | Good | Good | Good | Good | Acceptable |
| A20 | 775 | 46 | 75 | None | Good | Good | Good | Good | Good | Acceptable |
| A21 | 744 | 52 | 73 | None | Good | Good | Good | Good | Good | Acceptable |
| A22 | 760 | 47 | 74 | None | Good | Good | Good | Good | Good | Acceptable |
| A23 | 738 | 52 | 99 | None | Good | Good | Good | Good | Good | Acceptable |
| A24 | 785 | 47 | 74 | None | Good | Good | Good | Good | Good | Acceptable |

TABLE 8

| | | Deposited Metal Performance | | | | | Welding Workability Evaluation | | | | |
|---|---|---|---|---|---|---|---|---|---|---|---|
| | | Tensile Performance | | Impact | | | | | | | |
| | | Tensile Strength MPa | Elongation % | Performance $vE_{-196°C.}$ J | Presence or Absence of Cracking | Bending Performance | Arc Stability | Amount of Spatters Generated | Slag Peelability | Bead Appearance | Synthetic Judgement |
| Comparative Examples | B1 | <u>705</u> | 35 | 63 | None | Good | Good | Good | Good | Good | Unacceptable |
| | B2 | 762 | 36 | <u>21</u> | None | Good | Good | Good | Good | Good | Unacceptable |
| | B3 | 784 | 33 | <u>25</u> | None | Good | Poor | Poor | Good | Good | Unacceptable |
| | B4 | <u>708</u> | 42 | 71 | None | Good | Good | Good | Good | Good | Unacceptable |
| | B5 | 766 | 38 | <u>26</u> | None | Good | Good | Good | Good | Good | Unacceptable |
| | B6 | <u>698</u> | 37 | 63 | None | Good | Good | Good | Good | Good | Unacceptable |
| | B7 | 789 | 29 | 22 | None | Poor | Good | Good | Good | Good | Unacceptable |

TABLE 9

| Symbol | Sheet Thickness mm | Chemical Components of Base Metal Mass % | | | | | |
|---|---|---|---|---|---|---|---|
| | | C | Si | Mn | P | S | Ni |
| AA1 | 20 | 0.05 | 0.23 | 0.61 | 0.002 | 0.001 | 9.06 |
| AA2 | 25 | 0.05 | 0.21 | 0.58 | 0.003 | 0.001 | 9.12 |

With the core wires A1 to A24 in which the chemical composition and the value X were within the scope of the invention, it was possible to manufacture a weld metal excellent in all of a tensile strength, elongation, $vE_{-196°}$ C., cracking resistance, and bendability. In Examples A1 to A24, the arc stability, the amount of spatters generated, the slag peelability, the defect resistance, and the bead appearance were all excellent, and the welding workability was good.

The core wires B1 to B7 in which the chemical composition and the value X were out of the scope of the invention did not satisfy the acceptance criteria with respect to any one or more of the evaluation items.

In B1, the Ta content of the core wire was insufficient. Therefore, the tensile strength of the weld metal was insufficient in F11.

In B2, the Ta content of the core wire was excessive. Therefore, the low temperature toughness was insufficient in F12.

In B3, the REM content and the value X of the core wire were excessive. Therefore, in B3, the low temperature toughness of the weld metal was insufficient. Moreover, the arc stability was poor and the amount of spatters generated was excessive.

In B4 and B6, the value X of the core wire was insufficient. Therefore, in B4 and B6, the tensile strength of the weld metal was insufficient.

In B5 and B7, the value X of the core wire was excessive. Therefore, in B5 and B7, the low temperature toughness of the weld metal was insufficient, and the bendability of the weld metal was poor in some cases.

The invention claimed is:

1. A Ni-based alloy core wire for a covered electrode comprising, as a chemical composition, by unit mass %:
C: 0.0100% to 0.0800%;
Si: 0.010% to 0.800%;
Mn: 0.010% to 1.800%;
Mo: 15.0% to 28.0%;
W: 2.5% to 8.0%;
Cu: 0.10% to 1.20%;
Ta: 0.002% to 0.120%;
Ni: 65.0% to 82.3%;
Mg: 0% to 0.60%;
Al: 0% to 2.20%;
Ti: 0% to 2.20%;
P: 0.025% or less;

S: 0.025% or less;
N: 0% to 0.150%;
O: 0% to 0.012%;
Fe: 0% to 12.0%;
Co: 0% to 0.150%;
Cr: 0% to 0.150%;
V: 0% to 0.150%;
Nb: 0% to 0.150%;
B: 0% to 0.015%;
Bi: 0% to 0.080%;
Ca: 0% to 0.025%;
REM: 0% to 0.030%;
Zr: 0% to 0.150%; and
a remainder: impurities,
wherein a value X defined by Expression 1 is 0.010% to 0.160%, $$X=[Ta]+10\times[REM] \qquad \text{Expression 1}$$

here, symbols indicated in Expression 1 are amounts of corresponding elements by unit mass %.

2. A covered electrode comprising:
the Ni-based alloy core wire according to claim 1; and
a covering material which is provided on a surface of the Ni-based alloy core wire.

3. A method of manufacturing a covered electrode, comprising:
coating a covering material on the Ni-based alloy core wire according to claim 1; and
baking the Ni-based alloy core wire and the covering material.

4. A covered electrode manufactured by the method according to claim 3.

5. The Ni-based alloy core wire for a covered electrode according to claim 1, wherein the value X is 0.020% to 0.130%.

6. A covered electrode comprising:
the Ni-based alloy core wire according to claim 5; and
a covering material which is provided on a surface of the Ni-based alloy core wire.

7. A method of manufacturing a covered electrode, comprising:
coating a covering material on the Ni-based alloy core wire according to claim 5; and
baking the Ni-based alloy core wire and the covering material.

8. A covered electrode manufactured by the method according to claim 7.

* * * * *